(12) United States Patent
Jeon et al.

(10) Patent No.: US 8,031,737 B2
(45) Date of Patent: Oct. 4, 2011

(54) METHOD OF CHANGING CHANNELS AND CONFIGURING A SUB NETWORK IN A WIRELESS NETWORK

(75) Inventors: Beom Jin Jeon, Seoul (KR); Hyeon Cheol Cho, Seoul (KR); Taek Soo Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 70 days.

(21) Appl. No.: 12/373,263

(22) PCT Filed: Aug. 28, 2007

(86) PCT No.: PCT/KR2007/004136
§ 371 (c)(1),
(2), (4) Date: Jan. 9, 2009

(87) PCT Pub. No.: WO2008/026868
PCT Pub. Date: Mar. 6, 2008

(65) Prior Publication Data
US 2009/0310514 A1    Dec. 17, 2009

(30) Foreign Application Priority Data

Sep. 9, 2006    (KR) .................. 10-2006-0087114

(51) Int. Cl.
*H04J 3/16* (2006.01)
(52) U.S. Cl. .................. 370/437; 370/329; 370/461
(58) Field of Classification Search .................. 370/431, 370/437, 445, 462, 310, 328, 329, 458, 461; 455/403, 422.1, 455
See application file for complete search history.

(56) References Cited

U.S. PATENT DOCUMENTS

| 7,245,947 | B2 | 7/2007 | Salokannel et al. |
| 7,447,178 | B2 | 11/2008 | Kim et al. |
| 7,447,503 | B2 | 11/2008 | Shvodian |
| 7,463,886 | B2 | 12/2008 | Salokannel et al. |
| 7,606,199 | B2 | 10/2009 | Ayyagari et al. |
| 2004/0170217 | A1 | 9/2004 | Ho |
| 2004/0235489 | A1 | 11/2004 | Kwon |
| 2004/0255001 | A1 | 12/2004 | Oh et al. |

(Continued)

FOREIGN PATENT DOCUMENTS

EP    1487155    12/2004

(Continued)

OTHER PUBLICATIONS

Vasudevan et al. "Leader election algorithms for wireless ad hoc networks", IEEE DISCEX Apr. 22, 2003.

(Continued)

*Primary Examiner* — Aung S Moe
*Assistant Examiner* — Feben M Haile
(74) *Attorney, Agent, or Firm* — Lee, Hong, Degerman, Kang & Waimey (57) ABSTRACT

A method of changing channels of a first device in a wireless network, which includes a first coordinator and at least one device, comprises searching whether another channel other than a first channel which is currently used in the wireless network is available, changing the first channel to a second channel among at least one or more available channels as a result of the searching step, and transmitting data to a second device or receiving data from the second device through the second channel.

5 Claims, 7 Drawing Sheets

U.S. PATENT DOCUMENTS

| | | | |
|---|---|---|---|
| 2004/0264394 A1 | 12/2004 | Ginzburg et al. | |
| 2005/0023797 A1 | 2/2005 | Zackovich et al. | |
| 2005/0059420 A1 | 3/2005 | Salokannel et al. | |
| 2005/0090264 A1* | 4/2005 | Kim | 455/455 |
| 2005/0237979 A1 | 10/2005 | Kim et al. | |
| 2006/0159003 A1 | 7/2006 | Nanda et al. | |
| 2006/0233128 A1* | 10/2006 | Sood et al. | 370/328 |
| 2006/0242025 A1 | 10/2006 | Nishihara et al. | |
| 2006/0280140 A9 | 12/2006 | Mahany et al. | |
| 2007/0002809 A1 | 1/2007 | Reunamaki et al. | |
| 2007/0025384 A1 | 2/2007 | Ayyagari et al. | |
| 2007/0076614 A1 | 4/2007 | Cho | |
| 2007/0086378 A1* | 4/2007 | Matta et al. | 370/329 |
| 2007/0268862 A1* | 11/2007 | Singh et al. | 370/329 |
| 2007/0270121 A1* | 11/2007 | Shao et al. | 455/403 |
| 2007/0286140 A1 | 12/2007 | Kwon | |
| 2008/0013519 A1 | 1/2008 | Kwon et al. | |
| 2008/0037465 A1 | 2/2008 | Ngo et al. | |
| 2008/0080425 A1 | 4/2008 | Lee et al. | |
| 2008/0240146 A1* | 10/2008 | Singh et al. | 370/458 |
| 2008/0279160 A1 | 11/2008 | Qin et al. | |
| 2009/0067389 A1 | 3/2009 | Lee et al. | |

FOREIGN PATENT DOCUMENTS

| | | |
|---|---|---|
| EP | 1528717 | 5/2005 |
| JP | 2005-006327 | 1/2005 |
| JP | 2005-176356 | 6/2005 |
| JP | 2006-246357 | 9/2006 |
| KR | 10-2005-0100951 A | 10/2005 |
| KR | 10-0603560 | 7/2006 |
| WO | 2001003458 | 1/2001 |
| WO | 2006/049415 | 5/2006 |
| WO | 2007/004003 | 1/2007 |
| WO | 2007/142481 | 12/2007 |

OTHER PUBLICATIONS

Hayes et al. "Wireless LAN Medium Access Control (MAC) and Physical Layer (PH) specifications", IEEE Std 802.11 ISO/IEC 8802-11, Aug. 2005.

L. Gaetano, "60 GHz Architecture for Wireless Video Display," Mar. 2006, XP-002481628.

D. Trezentos et al., "Algorithms for Ad-hoc Piconet Topology Initialization—Evaluation for the IEEE802.15.3 High Rate WPAN System," Oct. 2003, pp. 3448-3452, XP-010701576.

K. Mase et al., "Scatternet Formation for Bluetooth Networks with Dynamic Membership," IEEE Vehicular Technology Conference, Apr. 2003, pp. 2028-2032, XP-010862515.

IEEE Standards Committee, "Part 15.3: Wireless Medium Access Control (MAC) and Physical Layer (PHY) Specifications for High Rate Wireless Personal Area Networks (WPANs)," IEEE Std 802.15.3, Jan. 2003, XP-017603623.

J. Habetha et al., "Central Controller Handover Procedure for ETSI-BRAN HiperLAN/2 Ad Hoc Networks and Clustering with Quality of Service Guarantees," Jan. 2000, pp. 131-132, XP-010511742.

* cited by examiner

→ High-rate PHY(HRP)
--→ Low-rate PHY(LRP)

METHOD OF CHANGING CHANNELS AND CONFIGURING A SUB NETWORK IN A WIRELESS NETWORK

TECHNICAL FIELD

The present invention relates to a wireless network, and more particularly, to a method of changing channels and configuring a sub-network in a wireless network.

BACKGROUND ART

Recently, Bluetooth, wireless personal area network (WPAN) technology has been developed, which allows audio or video data to be exchanged between devices by configuring a wireless network between a relatively small number of digital devices in limited places such as homes or small-scaled companies. WPAN can be used to exchange information between a relatively small number of digital devices in a relatively close distance, and enables communication of low power and low cost between digital devices. IEEE 802.15.3 (Wireless Medium Access Control (MAC) and Physical Layer (PHY) Specifications for High Rate Wireless Personal Area Networks (WPANs) approved on Jun. 12, 2003 defines specification of MAC and PHY layers of high-rate WPAN.

Figure 1:
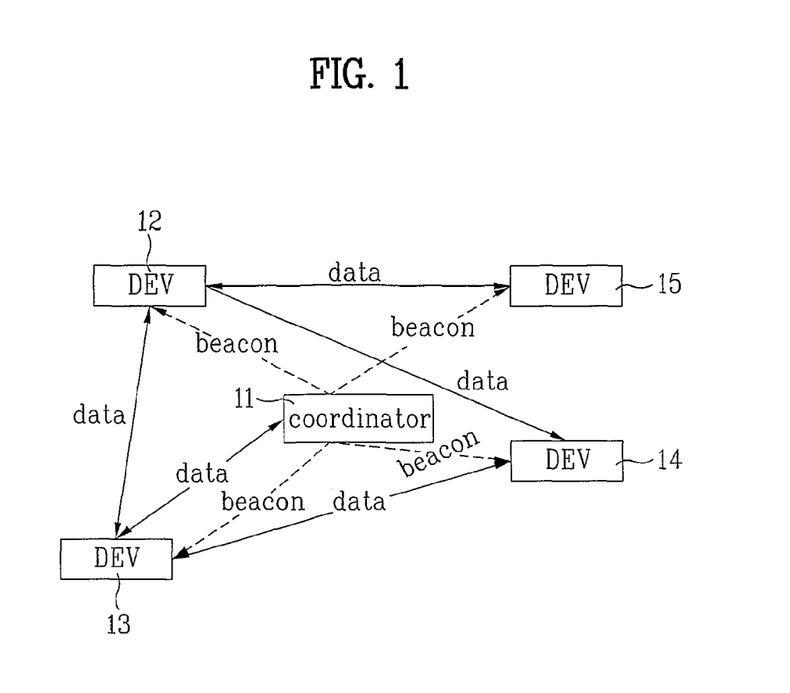
FIG. 1 is a diagram illustrating a configuration example of WPAN.

FIG. 1 is a diagram illustrating a configuration example of WPAN. As shown in FIG. 1, the WPAN is a network configured between devices within a limited place such as home. The network is configured by direct communication between devices to enable seamless exchange of information between applications.

Referring to FIG. 1, the WPAN is comprised of at least two user devices 11 to 15, wherein one of the user devices is operated as a coordinator 11. The coordinator 11 serves to provide basic timing of the WPAN and control quality of service (QoS) requirements. Examples of the user devices include computer, PDA, notebook computer, digital TV, camcorder, digital camera, printer, mike, speaker, headset, barcode reader, display, and cellular phones. All digital devices can be used as the user devices.

The WPAN is an ad hoc network (hereinafter, referred to as 'piconet') which is not previously designed but formed if necessary without assistance of a central infra. The procedure of forming one piconet will be described as follows. The piconet starts in such a manner that a device that can be operated as a coordinator performs a function of a coordinator. All devices start a new piconet or perform scanning before association with the existing piconet. Scanning means that a device collects and stores information of channels and searches the presence of the existing piconet. A device which has been instructed from an upper layer to start a piconet forms a new piconet without association with a piconet which is previously formed on a channel. The device starts a piconet by selecting a channel having little interference based on the data acquired during scanning and broadcasting a beacon through the selected channel. In this case, the beacon is timing allocation information, information of other devices within the piconet, and control information broadcasted by a coordinator to control and manage the piconet.

Figure 2:
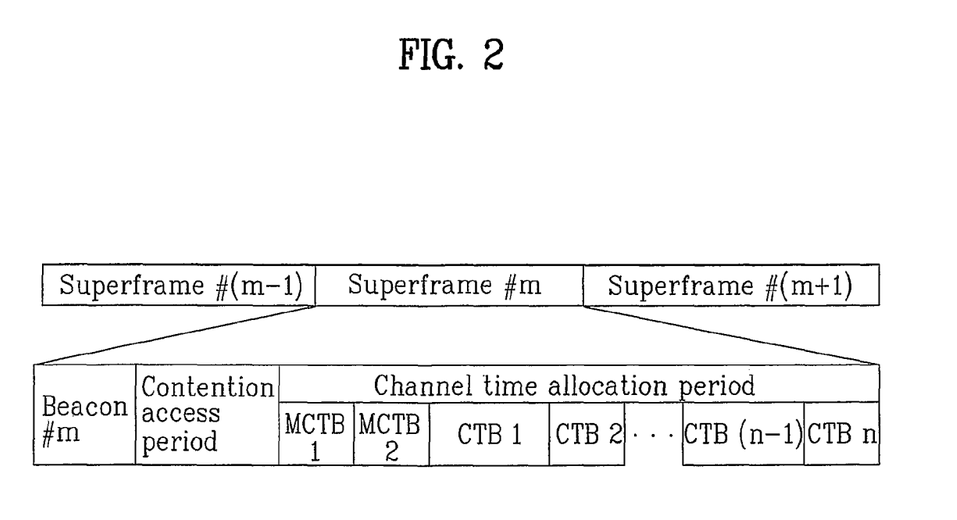
FIG. 2 is a diagram illustrating an example of a superframe used in a piconet.

FIG. 2 illustrates an example of a superframe used in the piconet. Timing control in the piconet is performed based on the superframe. Referring to FIG. 2, each superframe is started by a beacon transmitted from a coordinator. A contention access period (CAP) is used to allow devices to perform contention based transmission of commands or asynchronous data. A channel time allocation period may include a management channel time block (MCTB) and a channel time block (CTB). The MCTB is a period which transmits control information between a coordinator and a device or between devices, and the CTB is a period which transmits asynchronous or isochronous data between a device and a coordinator or between other devices. In each superframe, the number, the length and the position of the CAPs, the MCTBs, and the CTBs are determined by the coordinator and transmitted to other devices within the piconet through the beacon.

If a random device within the piconet needs to transmit data to the coordinator or another device, the device requests the coordinator to provide a channel time for data transmission, and the coordinator allocates the channel time to the device within the range of available channel resources. If a contention access period exists within the superframe and the coordinator allows data transmission in the contention access period, the device can transmit a small amount of data through the contention access period without the channel time allocated from the coordinator.

If the number of devices within the piconet is small, since channel resources which each device transmits data are sufficient, no special problem occurs in channel time allocation. However, if channel resources are insufficient due to a large number of devices, or if a specific device continues to occupy channels to transmit data of large capacity, such as moving pictures, even though the number of devices is small, a problem may occur in that communication is impossible as channel resources are not allocated to other devices having data to be transmitted. Also, even though channel resources are allocated to other devices, a problem may occur in that the channel resources are smaller than capacity of data stored in the other devices.

DISCLOSURE OF THE INVENTION

Accordingly, the present invention is directed to a method of changing channels and configuring a sub-network in a wireless network, which substantially obviates one or more problems due to limitations and disadvantages of the related art.

An object of the present invention is to provide a method of changing channels and configuring a sub-network in a wireless network, in which channel resources are efficiently used in the wireless network.

Another object of the present invention is to provide a method of changing channels and configuring a sub-network in a wireless network, in which a device belonging to the existing wireless network easily forms another wireless network by using another channel.

To achieve these objects and other advantages and in accordance with the purpose of the invention, as embodied and broadly described herein, a method of changing channels of a first device in a wireless network, which includes a first coordinator and at least one device, comprises searching whether another channel other than a first channel which is currently used in the wireless network is available, changing the first channel to a second channel among at least one or more available channels as a result of the searching step, and transmitting data to a second device or receiving data from the second device on the second channel.

In another aspect of the present invention, a method of changing channels of a first device in a wireless network, which includes a coordinator, comprises receiving a rejection response from the coordinator in response to an allocation request of channel resources in a channel which is currently used in the wireless network, searching whether another channel other than the current channel is available, requesting the coordinator of channel change to a specific channel among at least one or more available channels, and changing the current channel to the specific channel if the coordinator allows channel change.

In still another aspect of the present invention, a method of changing channels of a first device in a first wireless network, which performs communication through a first channel and a second channel, comprises searching another channel other than the first channel and the second channel to perform channel change, changing the first channel and the second channel to a third channel and a fourth channel selected by the searching result, and broadcasting a beacon through the fourth channel.

In further still another aspect of the present invention, a method of configuring a sub-network comprises searching whether another channel other than a first channel, which is currently used in a first wireless network which includes a coordinator, is available; changing the first channel to a second channel among at least one or more available channels as a result of the searching step, and configuring the sub-network on the second channel.

In the embodiments of the present invention, it is preferable that each of devices of a wireless network, which is newly formed by channel change, identifies a status of the existing wireless network. To this end, each device of the new wireless network needs to return to the existing wireless network for a certain period on a superframe. In particular, it is preferable to receive channels of the existing wireless network in a beacon transmission period or an unreserved period of the existing wireless network.

BEST MODE FOR CARRYING OUT THE INVENTION

Hereinafter, structures, operations, and other features of the present invention will be understood readily by the preferred embodiments of the present invention, examples of which are illustrated in the accompanying drawings. Embodiments described hereinafter are examples in which technical features of the present invention are applied to a wireless video area network (WVAN) which is a kind of WPAN.

Figure 3:
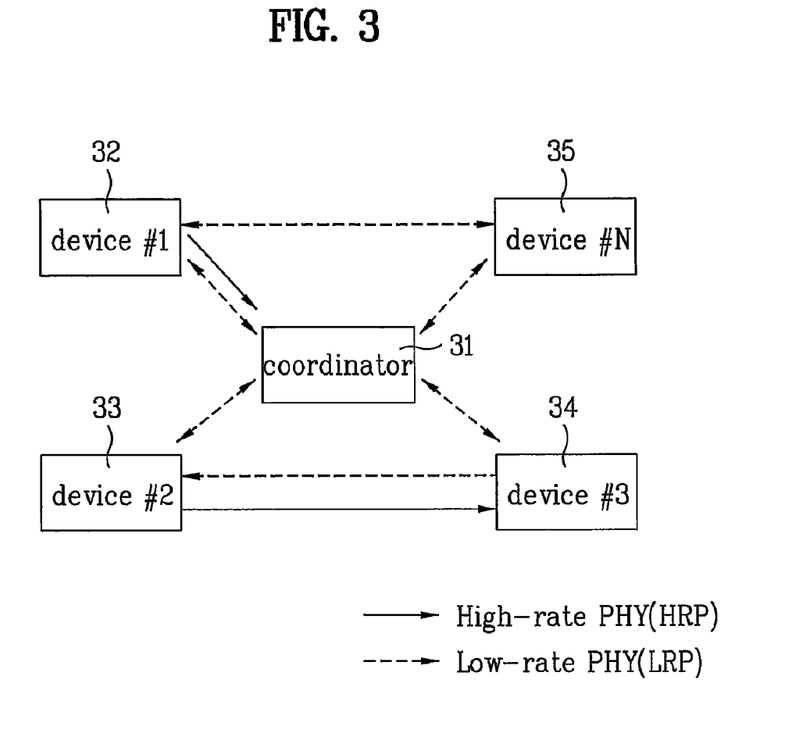
FIG. 3 is a diagram illustrating a configuration example of WVAN.

FIG. 3 illustrates a configuration example of WVAN. Like WPAN shown in FIG. 1, the WVAN includes at least two user devices 31 to 35, wherein one of the user devices is operated as a coordinator 31. The coordinator 31 serves to provide basic timing of the WVAN and control quality of service (QoS) requirements. Unlike the WPAN of FIG. 1, the WVAN shown in FIG. 3 supports two kinds of physical (PHY) layers. In other words, the WVAN supports physical layers, i.e., a high-rate physical (HRP) layer and a low-rate physical (LRP) layer. The HRP layer is a physical layer which supports a data transmission speed of 1 Gb/s or greater while the LRP layer is a physical layer which supports a data transmission speed of several Mb/s. The HRP layer is highly directional, and is used to transmit isochronous data streams, asynchronous data, MAC command, and A/V control data through unicast connection. The LRP layer supports a directional or omni-directional mode, and is used to transmit a beacon, asynchronous data, and MAC commands through unicast or broadcast.

Figure 4:
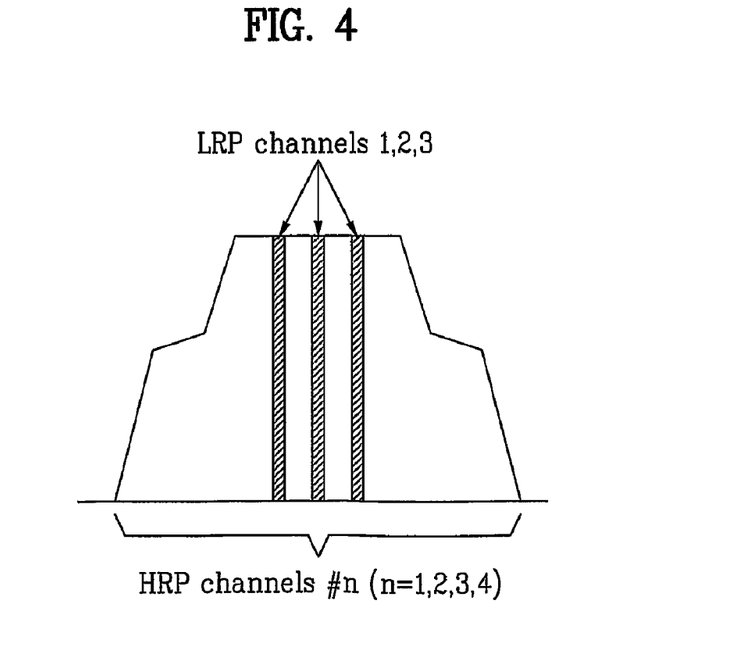
FIG. 4 is a diagram illustrating a frequency band of HRP and LRP channels used in WVAN.

FIG. 4 is a diagram illustrating a frequency band of HRP and LRP channels used in the WVAN. The HRP layer uses four channels of a bandwidth of 2.0 GHz in a band of 57-66 GHz, and the LRP uses three channels of a bandwidth of 92 MHz. As shown in FIG. 4, the HRP channels and the LRP channels commonly use a frequency band and are used respectively by a time division multiple access (TDMA) mode.

Figure 5:
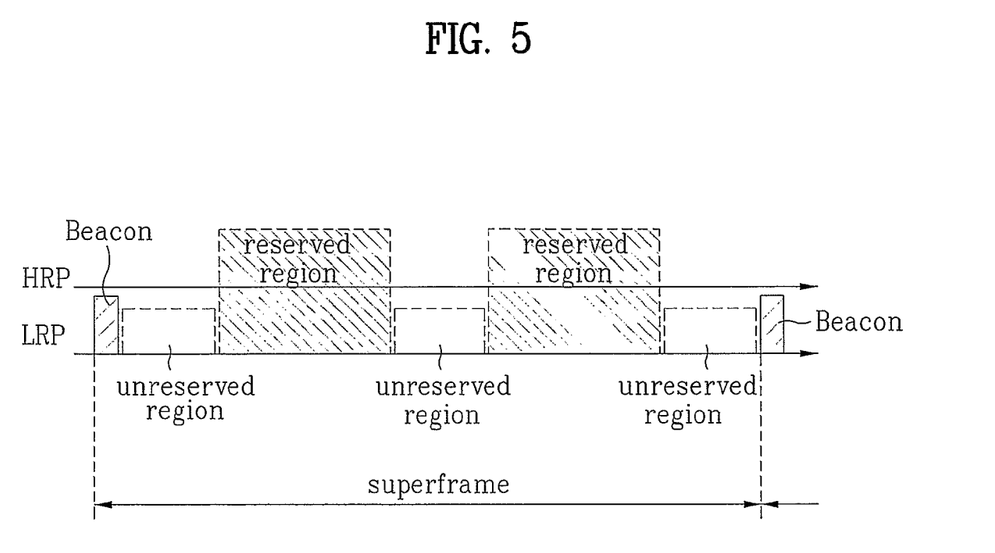
FIG. 5 is a diagram illustrating an example of a structure of superframes used in WVAN.

FIG. 5 is a diagram illustrating an example of a structure of a superframe used in the WVAN. Referring to FIG. 5, each superframe includes a beacon region through which a beacon is transmitted, a reserved region allocated to a device by the coordinator in accordance with a request of the device, and an unreserved region where data are transmitted and received between the coordinator and a device or between devices in accordance with a contention based mode without being allocated by the coordinator, wherein each of the regions is divided by time division. The beacon includes timing allocation information in a corresponding superframe and management and control information of WVAN. The reserved region is used to allow a device, to which a channel time is allocated by the coordinator in accordance with its channel time allocation request, to transmit data to another device. Commands, data streams, asynchronous data, etc. can be transmitted through the reserved region. If a specific device transmits data to another device through the reserved region, the HRP channel may be used. If a device which receives data transmits an acknowledgement or negative acknowledgement (ACK/NACK) signal in response to the received data, the LRP channel may be used. The unreserved region can be used to transmit control information, MAC commands or asynchronous data between the coordinator and the device or between the devices. To avoid data collision between the devices in the unreserved region, a carrier sense multiple access (CSMA) mode or a slotted Aloha mode can be used. In the unreserved region, data can be transmitted through the LRP channel only. If there are provided a lot of commands or control information to be transmitted, a reserved region may be set in the LRP channel. The length and the number of reserved regions and unreserved regions in each superframe may depend on superframe and may be controlled by the coordinator.

Figure 6:
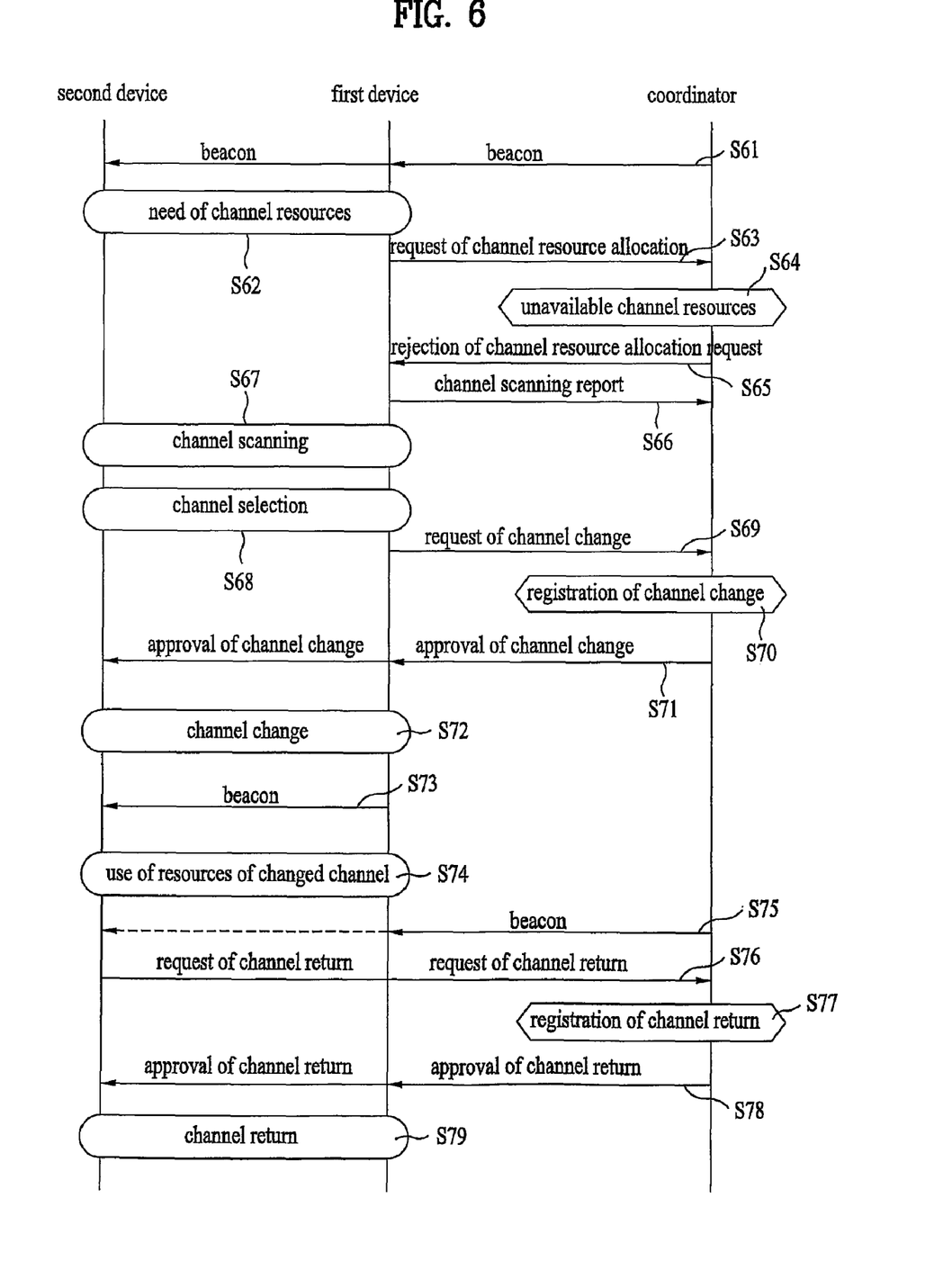
FIG. 6 is a flow chart illustrating a procedure according to the preferred embodiment of the present invention.

FIG. 6 is a flow chart illustrating a procedure according to the preferred embodiment of the present invention. In FIG. 6, it is assumed that the coordinator, a first device, a second device, and other devices constitute one WVAN through specific HRP and LRP channels. For convenience of description, the other devices except for the first and second devices are not shown.

Referring to FIG. 6, the coordinator broadcasts a beacon within the WVAN to allow the devices within the WVAN to receive the beacon (S61). The first device and the second device acquire channel time allocation information within a corresponding superframe and management or control information of WVAN through the received beacon. If the first device has data to be transmitted to the second device or data to be received from the second device, the first device requests the coordinator to allocate channel resources (S63). The coordinator determines whether there exist channel resources to be allocated to the first device in accordance with the allocation request of channel resources from the first device. If there do not exist channel resources to be allocated to the first device (S64), the coordinator transmits a rejection message of the allocation request of channel resources to the first device (S65).

The first device, which has received the rejection message of the allocation request of channel resources, reports to the coordinator that it will perform a scanning procedure in order to search whether there exist available channels among channels other than those which are currently used in the WVAN (S66). The first device and the second device perform scanning to select the most suitable channel among the available channels (S67). The scanning procedure may be performed by one of the first device and the second device or both of them. As a scanning sequence, a method of selecting the best HRP by selecting LRP channels having good channel status after checking a channel status of the LRP channels, and determining a channel status of HRP channels corresponding to the selected LRP channels can be considered. By contrast, LRP channels may be selected from the HRP channels selected by first scanning the HRP channels. If the scanning procedure is completed, the first device selects a channel to be moved through mutual negotiation based on the scanning result (S68). In other words, the first device and the second device select the most suitable set among sets of all HRP channels and LRP channels. Preferably, the first device and the second device select a channel having the smallest interference with the channel used in the existing WVAN.

The first device or the second device requests the coordinator to perform channel change to the selected HRP channel and LRP channel (S69). At this time, the first device provides indexes of the selected HRP channel and LRP channel and identification (ID) information of devices which will change the current channel to the selected channel, i.e., ID information of the second device. If the coordinator allows channel change of the first device and the second device, the coordinator registers the fact of channel change (S70), and transmits an approval message of channel change to the first device and the second device (S71). In this case, the coordinator may transmit an approval message of channel change to the first device which has requested channel change, and then the first device may forward the approval fact of channel change to the second device. The coordinator makes a list of devices which perform channel change and stores the list to periodically or non-periodically notify other devices of the list. If the first device and the second device receive the approval message of channel change from the coordinator, they change the current channel to the selected HRP channel and LRP channel (S72).

After channel change, the first device and the second device constitute a sub network, and one of them operate as a coordinator on a new channel. Several methods of selecting a device operated as a coordinator may be considered. For example, a device (first device in FIG. 6) which has requested the coordinator of channel change may be operated as a coordinator. As another method, a method of determining a device which will be operated as a coordinator in accordance with a priority which is previously determined may be considered. In other words, since some devices may not be suitable to be operated as a coordinator which serves to manage and control one WVAN, priority which considers various features of a device may be set previously to allow all devices within the WVAN to commonly use priority information of all devices within the WVAN. In this case, it is possible to easily determine which one of the devices should be operated as a coordinator. Features of the device, which can be considered in determining priority, include whether moving pictures can be displayed, whether the power is continuously turned on, proximity with other devices, output power, etc.

Figure 7:
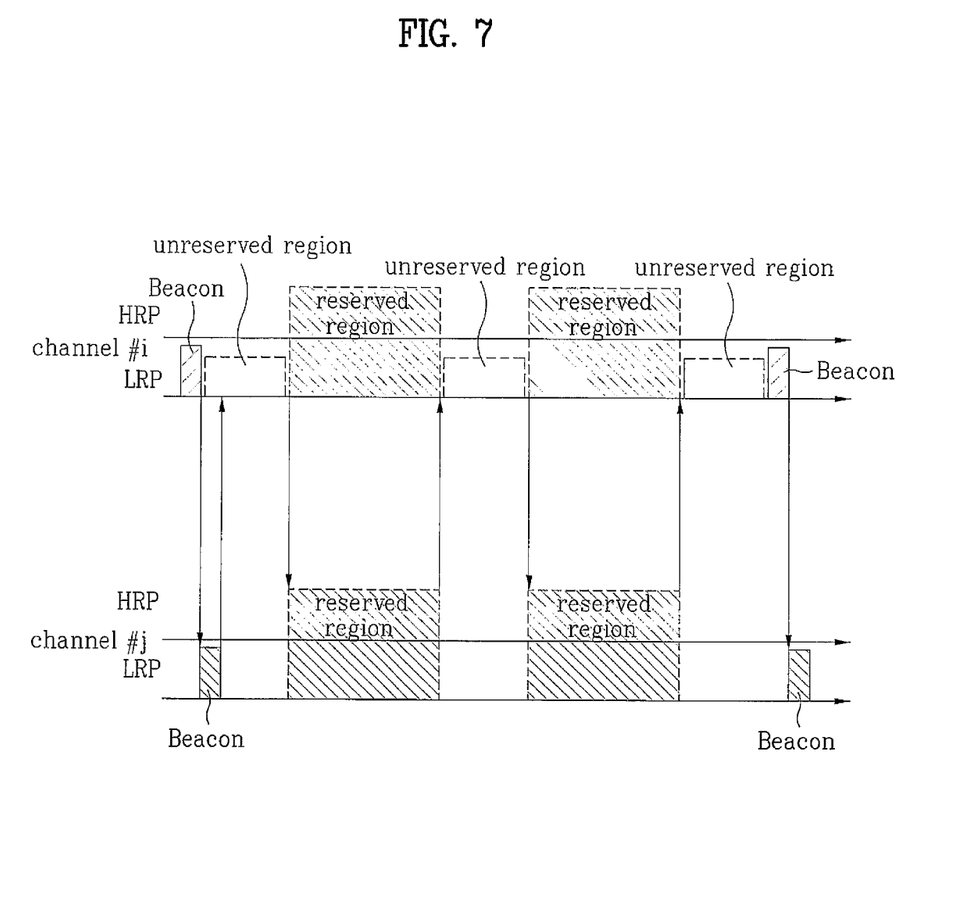
FIG. 7 is a diagram illustrating an example of an operation procedure of a device after channel change in accordance with the preferred embodiment of the present invention.

In FIG. 6, the first device is operated as the coordinator after channel change. Referring to FIG. 6, the first device transmits the beacon through the changed channel. FIG. 7 is a diagram illustrating an example of an operation procedure of a device after channel change in accordance with the preferred embodiment of the present invention. In FIG. 7, a channel #i represents a channel before channel change, and #j represents a channel after channel change. Both the channel #i and the channel #j include HRP channel and LRP channel. It is regarded that a new WVAN is formed on the channel #j as the first device changes the current channel to the channel #j and then broadcasts the beacon. However, the new WVAN may be referred to as an auxiliary WVAN temporarily formed using another channel as the devices on the existing WVAN cannot acquire sufficient channel resources on the existing WVAN. Preferably, the first device includes identification information in its beacon to allow a device which is intended to be newly associated with a network to be selectively associated with the existing WVAN or a new WVAN, wherein the identification information indicates that the new WVAN is an auxiliary network of the existing WVAN.

Referring to FIG. 7, if the first device and the second device, which form a new WVAN, need to know the status of the existing WVAN, they return to the original channel #i periodically or non-periodically and can receive LRP channel or HRP channel for a certain period. For example, the first device and/or the second device previously identifies transmission period information on a superframe from the beacon transmitted from a coordinator (hereinafter, referred to as 'first coordinator') of the existing WVAN, and can receive the beacon transmitted from the first coordinator and/or an unreserved region in the channel #i if necessary or periodically. In this case, it is preferable that the first device and the second device receive the beacon transmitted from the first coordinator and the unreserved region directly following the beacon.

Although a coordinator (first device, hereinafter, referred to as 'second coordinator') of a new WVAN may synchronize with the beacon transmitted from the first coordinator to transmit a beacon of a new WVAN, it may transmit the beacon of the new WVAN regardless of the beacon transmitted from the first coordinator. In FIG. 7, the second coordinator synchronizes with the beacon transmitted from the first coordinator to transmit its beacon. Since the beacon transmitted from the first coordinator includes channel duration information of a superframe of the channel used in the existing WVAN, the second coordinator can identify a beacon region, a reserved region and an unreserved region of the channel #i. The second coordinator sets a beacon region to be allocated to the channel #j, a reserved region, and a region to be hopped to the channel #i in its beacon based on the above information, and broadcasts the set regions. Then, all the devices (second device in FIG. 6) which have moved to the channel #j use the channel #j and hops to the channel #i to commonly use the unreserved region of the channel #j, thereby transmitting and receiving control and management information through the LRP channel of the channel #i. If the first device and the second device end reception of the unreserved region, they perform channel change in accordance with beacon information received through the channel #i, switch to a transmission and reception mode of the channel #j, and perform communication scheduled by the beacon transmitted by the second coordinator. If the presence of data to be transmitted to the first device or the second device through the reserved region of the channel #i is identified by the beacon transmitted from the first coordinator, the first device or the second device can receive the data by switching to the channel #i if necessary.

If data transmission and reception is performed between the first device (second coordinator) and the second device in the reserved region of the channel #j, the receiving side may be required to transmit ACK signal or NACK signal in accordance with ARQ (Automatic Repeat reQuest) or HARQ (Hybrid Automatic Repeat reQuest) of data packets transmitted from the transmitting side. In this case, the receiving side uses the LRP region of the channel #j. The second coordinator can perform communication by switching between the channel #i and the channel #j using the channel duration information of the channel #i included in the beacon transmitted from the first coordinator. To allow the second coordinator to commonly use the unreserved region of the channel #i in a larger range, the reserved region of the channel #i may match with the reserved region of the channel #j, or the reserved region of the channel #j may be defined to be smaller than the reserved region of the channel #i, whereby the second coordinator can receive all of the unreserved region of the channel #i.

Referring to FIG. 6 again, if data transmission on the channel #j is completed between the first device and the second device, the first device and the second device request the first coordinator of channel return (S76). The first coordinator registers channel return of the first device and the second device (S77), and transmits an approval message of channel return (S78). If the approval message of channel return is received, the first device and the second device return to the original channel #i (S79).

Figure 8:
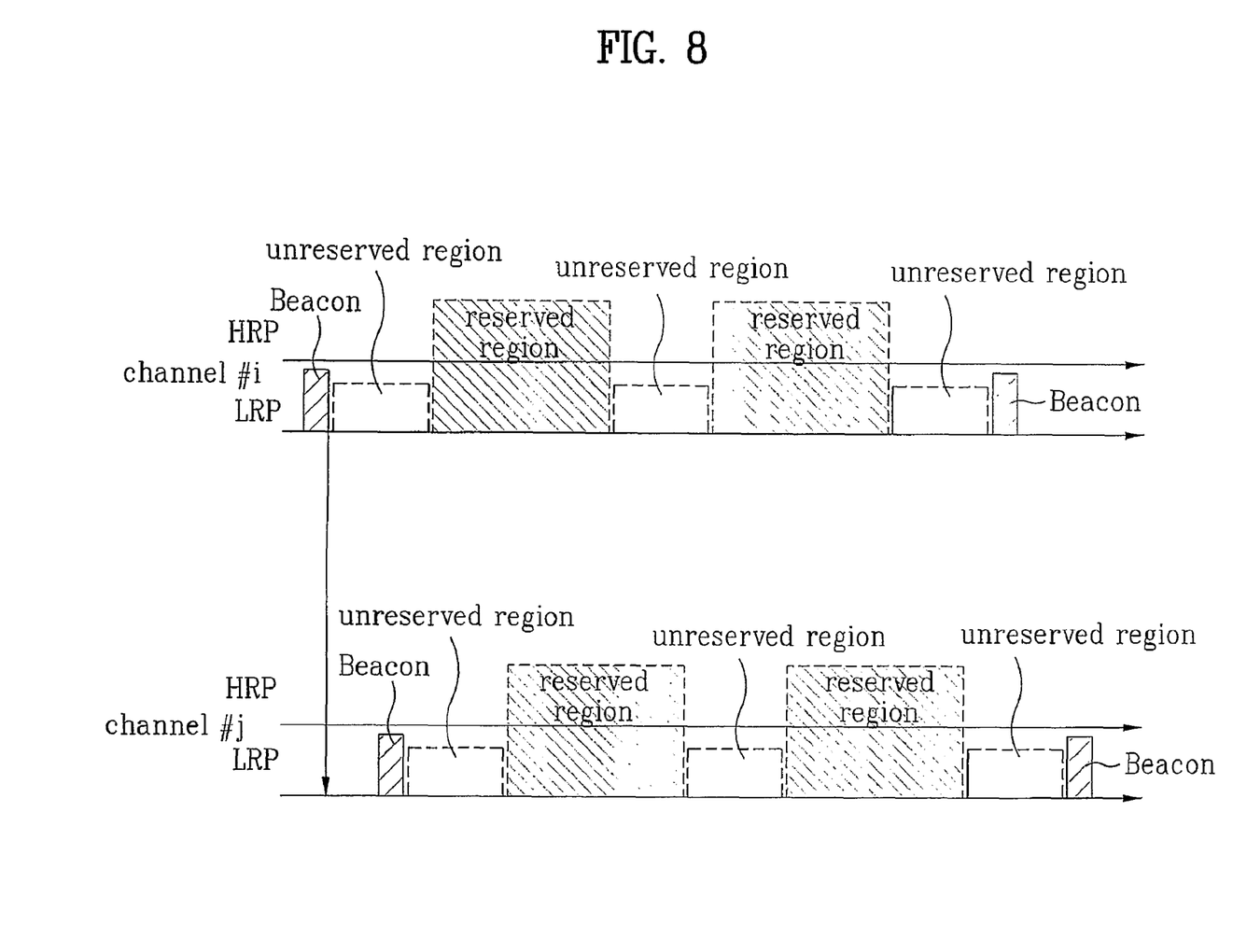
FIG. 8 is a diagram illustrating another example of an operation procedure of a device after channel change in accordance with the preferred embodiment of the present invention.

FIG. 8 illustrates another example of an operation procedure of devices after channel change in accordance with the preferred embodiment of the present invention. In the example of FIG. 6, after the first device and the second device perform channel change (S72), they operate as a new WVAN regardless of the existing WVAN. In the example of FIG. 7, the first device and the second device repeat channel switching to identify the status of the existing WVAN even after channel change, thereby receiving the beacon of the channel #i which the existing WVAN uses and/or the unreserved region. However, in the example of FIG. 8, the first device and the second device independently form a new WVAN after channel change to perform communication. Accordingly, the second coordinator of the new WVAN can transmit its beacon without synchronizing with the beacon transmitted from the first coordinator of the existing WVAN. Also, since the reserved region and the unreserved region can be used respectively in the new WVAN by using the HRP channels and the LRP channels, the new device can be associated with the new WVAN. If communication between the first device and the second device ends, the first device and the second device switch the current channel to the channel #i to return to the existing WVAN and receive the beacon transmitted from the first coordinator. The first device and the second device request the first coordinator of channel return and receive an approval of the channel return request from the first coordinator to perform normal communication in the existing WVAN.

Figure 9:
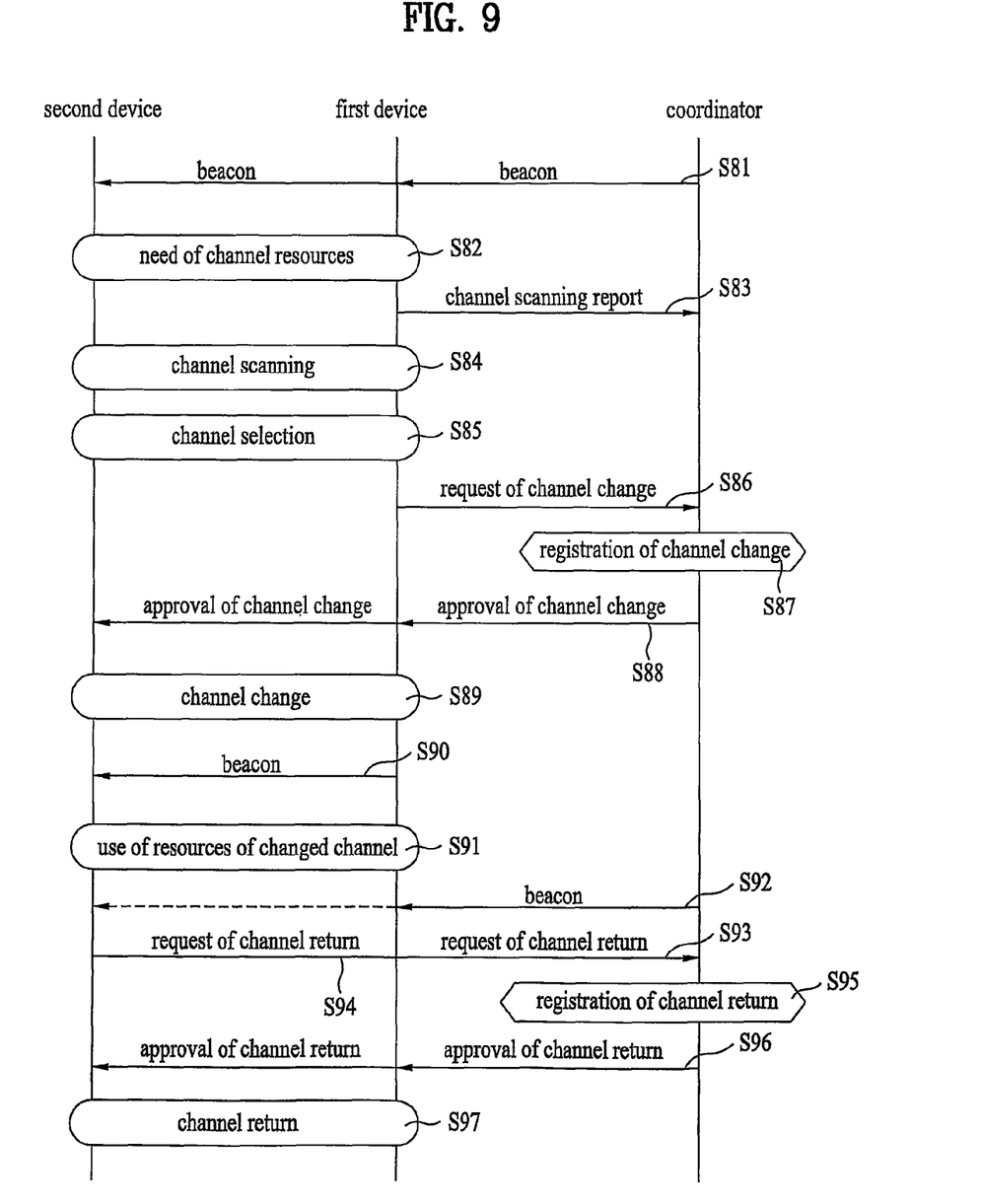
FIG. 9 is a flow chart illustrating another procedure according to the preferred embodiment of the present invention.

FIG. 9 is a flow chart illustrating another procedure according to the preferred embodiment of the present invention. As compared with the embodiment of FIG. 6, in the embodiment of FIG. 9, the first device and the second device perform scanning (S83 and S84) without requesting the coordinator of channel resource allocation when channel resources are requested, and perform channel change directly after selecting a channel (S85), so as to form an auxiliary WVAN. For example, if it is necessary to continue to transmit data streams of large capacity between the first device and the second device which belong to the existing WVAN while identifying the status of the existing WVAN, and if the first device and the second device need to quickly return to the existing WVAN after transmission, it is necessary to generate a new auxiliary WVAN in the existing WVAN using channels other than those used in the existing WVAN without requesting channel resource allocation in the existing WVAN. Since the other steps are the same as those described with reference to FIG. 6 and FIG. 7, or FIG. 8, their detailed description will be omitted.

According to the present invention, the wireless network can efficiently use the channel resources, and the device which belongs to the existing wireless network can easily form another wireless network by using another channel.

Terminologies used herein may be replaced with other terminologies. For example, the device may be replaced with a user device (or apparatus) or station, the coordinator may be replaced with a coordinating apparatus (or control apparatus), a coordinating device (or control device), a coordinating station (or control station), or piconet coordinator (PNC).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments according to the present invention may be implemented by various means, for example, hardware, firmware, software, or their combination. If the embodiment according to the present invention is implemented by hardware, it may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by hardware, it may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The invention claimed is:

1. A method of establishing a sub-network by a device of a first wireless network, the method comprising:
   searching whether another channel other than a first channel is available, the first channel comprising a first high-rate physical channel and a first low-rate physical channel, wherein the first high-rate physical channel and the first low-rate physical channel exist within a first frequency band and are currently used in the first wireless network which comprises a coordinator;
   switching from the first channel to a second channel based on the searching result, the second channel comprising a second high-rate physical channel and a second low-rate physical channel which exist within a second frequency band among at least one available channel;
   establishing the sub-network on the second channel to broadcast a beacon on the second low-rate physical channel, wherein the coordinator continues to broadcast a beacon on the first low-rate physical channel in the first wireless network after the sub-network is established on the second channel; and
   returning to the first channel periodically for a certain period to receive a beacon transmitted from the coordinator and an unreserved region following the beacon, wherein the device comes back to the second channel after receiving the beacon and the unreserved region on the first channel to communicate with at least one device in the sub-network.

2. The method of claim 1, wherein the sub-network is a temporarily formed network.

3. The method of claim 1, wherein the beacon broadcasted by the device on the second low-rate physical channel comprises identification information which indicates that the sub-network is a temporarily formed network.

4. A device for use in a wireless network, the device configured to:
   search whether another channel other than a first channel is available, the first channel comprising a first high-rate physical channel and a first low-rate physical channel is available, wherein the first high-rate physical channel and the first low-rate physical channel exist within a first frequency band, and are currently used in a first wireless network which comprises a coordinator;
   switch from the first channel to a second channel based on the searching result, the second channel comprising a second high-rate physical channel and a second low-rate physical channel which exist within a second frequency band among at least one available channel based on the searching result;
   transmit a beacon on the second low-rate physical channel in a sub-network established on the second channel, wherein the coordinator continues to broadcast a beacon on the first low-rate physical channel in the first wireless network after the sub-network is established on the second channel; and
   return to the first channel periodically for a certain period to receive a beacon transmitted from the coordinator and an unreserved region following the beacon, wherein the device comes back to the second channel after receiving the beacon and the unreserved region on the first channel to communicate with at least one device in the sub-network.

5. The device of claim 4, wherein the beacon broadcasted in the sub-network comprises identification information which indicates that the sub-network is a temporarily formed network.

* * * * *